United States Patent
van Genuchten et al.

(10) Patent No.: US 10,113,585 B2
(45) Date of Patent: Oct. 30, 2018

(54) CABLED BEARING

(71) Applicant: Aktiebolaget SKF, Gothenburg (SE)

(72) Inventors: Henricus van Genuchten, Utrecht (NL); Thomas Hubertus Theresia Vrancken, Wessem (NL)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/798,503

(22) Filed: Oct. 31, 2017

(65) Prior Publication Data

US 2018/0128311 A1  May 10, 2018

(30) Foreign Application Priority Data

Nov. 7, 2016 (DE) .......................... 10 2016 221 763

(51) Int. Cl.
| F16C 19/52 | (2006.01) |
| F16C 41/00 | (2006.01) |
| F16C 33/58 | (2006.01) |
| F16C 19/22 | (2006.01) |

(52) U.S. Cl.
CPC ............ *F16C 19/52* (2013.01); *F16C 19/22* (2013.01); *F16C 33/583* (2013.01); *F16C 41/00* (2013.01); *F16C 2233/00* (2013.01)

(58) Field of Classification Search
CPC ........ F16C 19/22; F16C 19/52; F16C 33/583; F16C 41/00; F16C 2233/00
See application file for complete search history.

(56) References Cited

U.S. PATENT DOCUMENTS

| 4,904,936 A * | 2/1990 | Richmond ............ F16C 41/007 188/181 R |
| 4,988,219 A * | 1/1991 | Peilloud ................ F16C 33/723 384/448 |
| 5,125,845 A * | 6/1992 | Benktander ........... F16C 41/007 384/448 |
| 5,127,747 A * | 7/1992 | Hilby ...................... G01P 3/443 310/168 |
| 5,158,374 A * | 10/1992 | Peilloud .................. G01P 3/443 384/448 |
| 6,113,276 A * | 9/2000 | Bourgeois-Jacquet ...................... F16C 19/362 324/207.25 |
| 6,333,628 B1 * | 12/2001 | Yeh ........................ F16C 29/005 310/12.19 |

(Continued)

*Primary Examiner* — Alan B Waits
(74) *Attorney, Agent, or Firm* — Bryan Preckjian; SKF USA Inc. Patent Dept.

(57) ABSTRACT

A rolling element bearing having first and second bearing rings and at least one row of rolling elements disposed between raceway surfaces of the bearing rings. The bearing further includes at least one sensor provided on a sensing surface of the first bearing ring, and a signal-carrying cable in connection with the sensor. The cable provides a cable connector, which fits into a socket. The socket is integrated in a recess provided in an external surface of the first bearing ring. The recess is in communication with the sensing surface and a signal coupling is provided between the sensor and the socket. One of the cable connector and the socket has an angled body section angled with a first angle α relative to a longitudinal axis of the recess, such that the cable is guided out of the recess at an angle to a normal of the external surface.

12 Claims, 4 Drawing Sheets

(56) References Cited

U.S. PATENT DOCUMENTS

| | | | | |
|---|---|---|---|---|
| 6,422,075 B1* | 7/2002 | Foster | G01P 1/026 | 324/160 |
| 6,948,856 B2* | 9/2005 | Takizawa | F16C 19/525 | 384/448 |
| 8,790,013 B2* | 7/2014 | Reedman | G01D 5/35303 | 384/448 |
| 2003/0048962 A1* | 3/2003 | Sato | D21G 1/0226 | 384/448 |
| 2003/0051549 A1* | 3/2003 | Sherman | F16C 19/50 | 73/494 |
| 2003/0201766 A1* | 10/2003 | Faetanini | G01P 1/026 | 324/173 |
| 2003/0215168 A1* | 11/2003 | Krabill | G01P 3/443 | 384/448 |
| 2004/0109623 A1* | 6/2004 | Ulrici | G01D 11/245 | 384/448 |
| 2006/0257060 A1* | 11/2006 | Gempper | F16C 19/522 | 384/448 |
| 2006/0277985 A1* | 12/2006 | Faetanini | B60B 27/00 | 73/121 |
| 2006/0288783 A1* | 12/2006 | Ricker | F16C 19/52 | 73/593 |
| 2007/0053623 A1* | 3/2007 | Maeda | B60B 27/00 | 384/448 |
| 2010/0098362 A1* | 4/2010 | Chaussat | F16C 33/80 | 384/448 |
| 2010/0172605 A1* | 7/2010 | Pausch | F16C 33/416 | 384/446 |
| 2012/0160026 A1* | 6/2012 | Yamashita | G01P 3/443 | 73/504.01 |
| 2013/0272637 A1* | 10/2013 | Schaefer | G01D 11/245 | 384/448 |
| 2014/0086519 A1* | 3/2014 | Rink | F16C 23/086 | 384/497 |
| 2014/0185973 A1* | 7/2014 | Barcat | G01D 5/24433 | 384/448 |
| 2014/0333070 A1* | 11/2014 | Van Der Ham | F01D 1/04 | 290/52 |
| 2015/0192430 A1* | 7/2015 | Blokland | G01D 5/244 | 324/207.25 |
| 2015/0323013 A1* | 11/2015 | Herdier | F16C 19/522 | 384/448 |
| 2016/0146254 A1* | 5/2016 | Katsaros | G01K 7/02 | 384/448 |
| 2016/0215816 A1* | 7/2016 | Hofmann | F16C 41/007 | |
| 2016/0312835 A1* | 10/2016 | Nicolas | G01D 5/244 | |
| 2017/0282940 A1* | 10/2017 | Rossi | B61F 15/20 | |
| 2017/0350453 A1* | 12/2017 | Capoldi | F16C 19/36 | |
| 2018/0031446 A1* | 2/2018 | Winker | F16C 11/06 | |

* cited by examiner

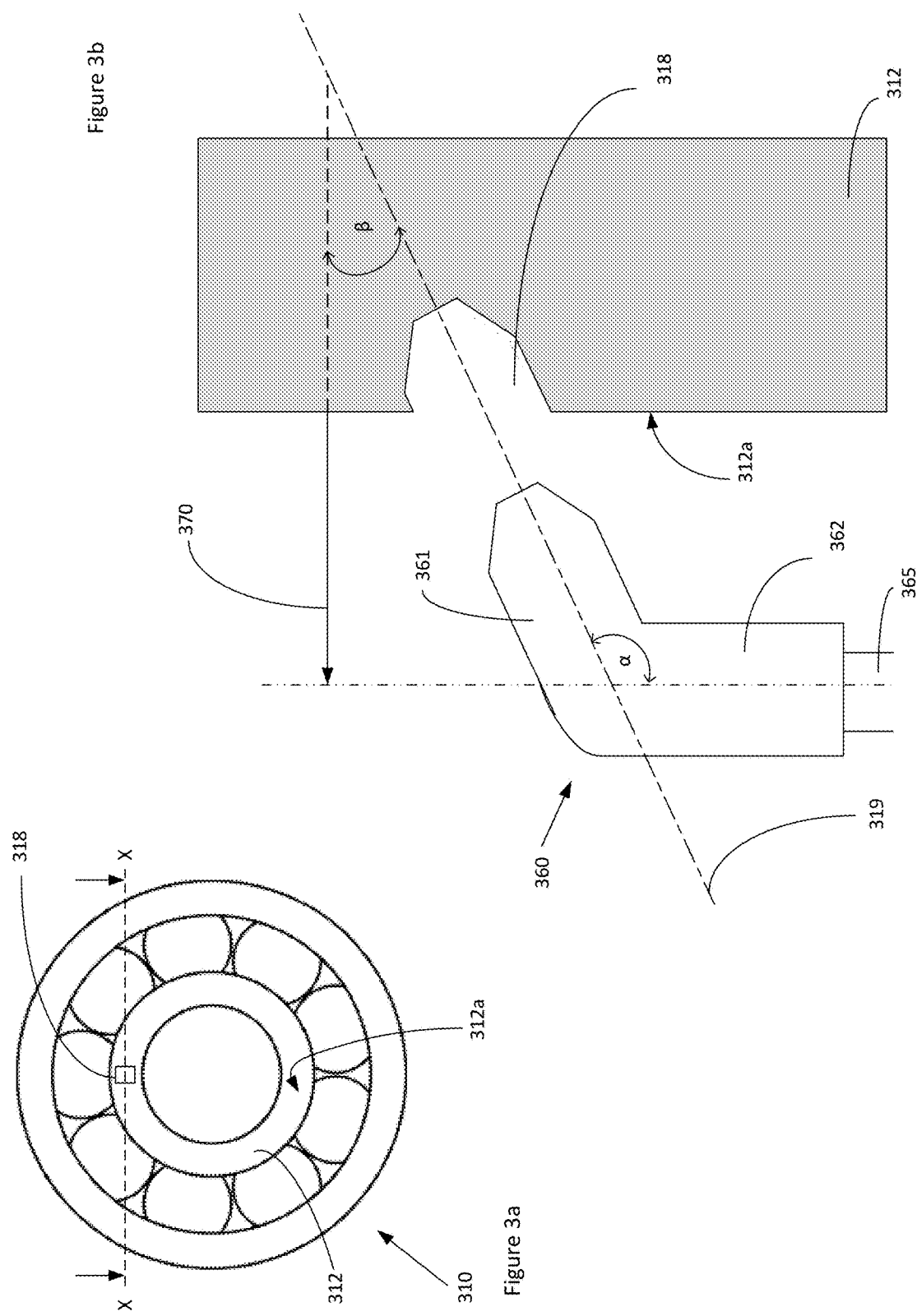

CABLED BEARING

CROSS-REFERENCE

This application claims priority to German patent application no. 102016221763.1 filed on Nov. 7, 2016, the contents of which are fully incorporated herein by reference.

TECHNOLOGICAL FIELD

The invention is related to condition monitoring of bearings, and is more particularly directed to a bearing comprising a sensor in communication with a signal cable, which cable exits the arrangement in which the bearing is mounted.

BACKGROUND

A bearing equipped with an optical sensing fiber is one example of a cabled bearing of this kind. WO 2011/066929, for example, discloses a bearing with a circumferential groove in an outer ring of the bearing, whereby the groove accommodates a sensing fiber for measuring, in particular, bearing load. Typically, the sensing fiber is connected to an optical interrogator via a fiber-optic cable, whereby the interrogator is located outside the bearing arrangement. The cable emerges from a surface of the bearing and is then led out of the bearing arrangement.

A further example of a cabled bearing is described in EP 1548419, which relates to a system for diagnosing a presence or absence of an abnormality of a bearing unit for a railway vehicle axle. The system comprises a sensing/processing portion for outputting a signal generated from the bearing unit as an electric signal, and a calculating/processing portion for making an abnormality diagnosis of the bearing unit based on an output of the sensing/processing portion. The signal is transmitted via a cable that is preferably waterproof, oil-resistant and heat resistant.

The present invention seeks to address some of the problems associated with mounting a bearing comprising a cable that is attached to the bearing, and guiding the cable as it emerges from the bearing in the application.

SUMMARY

In many applications, the cable has to emerge into an enclosed space that is at least partly filled with lubricant. During bearing operation, this creates a flow of lubricant within the bearing arrangement, in a circumferential direction of the bearing, which can place a strain on the cable. This may be the case for cables which carry an optical signal or an electrical signal. Furthermore, the cabled bearing can be cumbersome to handle and is susceptible to damage during transportation and installation.

The invention resides in a rolling element bearing comprising first and second bearing rings and at least one row of rolling elements disposed between raceway surfaces of the bearing rings, whereby the bearing further comprises at least one sensor provided on a sensing surface of the first bearing ring, and a signal-carrying cable in connection with the sensor. The cable includes a cable connector, which fits into a socket. In accordance with the invention, the socket is at least partly integrated in a recess provided in an external surface of the first bearing ring, whereby the recess is in communication with the sensing surface and a signal coupling is provided between the sensor and the socket. Furthermore, one of the cable connector and the socket has an angled body section that is angled with a first angle α relative to a longitudinal axis of the recess. The cable is guided out of the recess at an angle to a normal of the external surface, in a substantially circumferential direction of the bearing.

Consequently, it is possible to reduce or minimise a surface area of the cable that runs transverse to the lubricant flow within the bearing arrangement, thereby reducing the strain on the cable. Preferably, the circumferential direction coincides with the direction of rotation of the bearing during operation, so that the cable is oriented in the same direction as the flow of lubricant within the bearing arrangement.

The precise circumferential direction of the bearing is perpendicular to the normal of the external surface in which the recess is provided. In some embodiments therefore, the cable extends from the cable connector at approximately 90° to the aforementioned surface normal. In other embodiments, the cable extends from the connector at angle of between 70 and 120°, which still allows a useful reduction in the strain exerted on the cable.

In some examples, the longitudinal axis of the recess is essentially parallel to the normal of the external surface in which the recess is provided. The first angle α of the angled body section is then preferably between 70° and 120°, most preferably around 90° so that the cable direction is perpendicular to the surface normal and thus follows the circumferential direction of the bearing with precision.

In other examples, the longitudinal axis of the recess is angled with a second angle β relative to the normal of the external surface in which the recess is provided. The direction of the cable relative to the circumferential direction depends on the first angle α and on the second angle β. When the second angle is non-zero, it is possible for the first angle α to be larger than 90°, while the cable direction remains perpendicular to the surface normal and is guided precisely in the circumferential direction of the bearing. Particularly when the cable is a fiber-optic cable, it can be advantageous to execute the angled body section of the connector with an obtuse angle. In some embodiments of this kind, the first angle α of the angled body section, relative to the longitudinal axis of the recess, lies between 90 and 140°.

In one embodiment, the socket is fully integrated within the recess. This has the advantage of making the bearing easier to handle and mount, due to the absence of protruding parts. The cable connector then comprises the angled body section and further comprises a straight body section that fits into the socket.

In a further development, the coupling between the cable connector and the socket allows the straight body section to swivel through 180° within the socket. The socket and cable connector then suitably have a circular geometry. This has the advantage that the circumferential orientation of the angled body section, and thus the direction in which the cable is guided out of the recess, can be easily reversed if the rotation direction of the bearing changes. A jack-plug-type optical/electrical coupling is one example of a suitable coupling.

In an alternative embodiment, the socket comprises the angled body section, which protrudes from a straight body section that is integrated in the recess. Suitably, the cable connector then has only a straight body section that fits into the angled body section of the socket.

The first bearing ring which comprises the sensor and cable connection is a non-rotational bearing ring of the bearing. This can be an inner ring of the bearing or an outer ring of the bearing, depending on the application. The bearing can be a radial bearing, a thrust bearing, or a slewing bearing.

The sensing surface of the first bearing ring may be a cylindrical surface or an annular side face of the first bearing ring. Preferably, the sensing element is embedded within a groove, so that the dimensions of the bearing are unaffected.

Depending on the application and mounting constraints, the external surface of the first bearing ring in which the recess is provided can be the outer cylindrical surface of a bearing outer ring or the annular side face of an inner or outer ring. In one example, the bearing outer ring is the non-rotational bearing ring, whereby the sensing surface is a groove provided in the outer cylindrical surface and the recess for the socket is provided in a side face of the outer ring.

The sensor with which the bearing is equipped may be adapted to measure one or more of strain, vibration, temperature, acoustic emission or rotation speed. The bearing may also be equipped with more than one sensor. In one embodiment, the sensor is an optical sensing fiber, such as an FBG sensor comprising Bragg gratings, and the cable is a fiber-optic cable. The fiber-optic connector and socket may be adapted for a screw coupling, snap coupling, push-pull coupling, or a bayonet coupling, or other suitable type of optical fiber coupling.

In a further embodiment, the sensor outputs an electrical signal which is carried by an electrical signal cable. The sensor may be e.g. a piezoelectric strain gauge or a MEMS vibration sensor or a BAW/SAW sensor. The electrical cable connector and socket may also be adapted for a screw coupling, push-pull coupling or other suitable type of electrical coupling. The cable may also be adapted to supply electrical power. In one example, the bearing is equipped with a sensor unit comprising a processor, whereby the electrical power is supplied to the processor via the cable, which furthermore carries a processed sensor signal.

BRIEF DESCRIPTION OF THE DRAWINGS

The invention will now be described in more detail for explanatory, and in no sense limiting, purposes, with reference to the following figures, in which:

FIG. 1b is a side view of the angled connector from FIG. 1a

FIG. 3a is a front view of a third example of a bearing comprising a recess for receiving a cable connector;

FIG. 3b shows the cable connector and a cross-sectional view of the bearing from FIG. 3a, taken along a plane X-X that intersects the recess in radial direction.

DETAILED DESCRIPTION

Figure 1A:
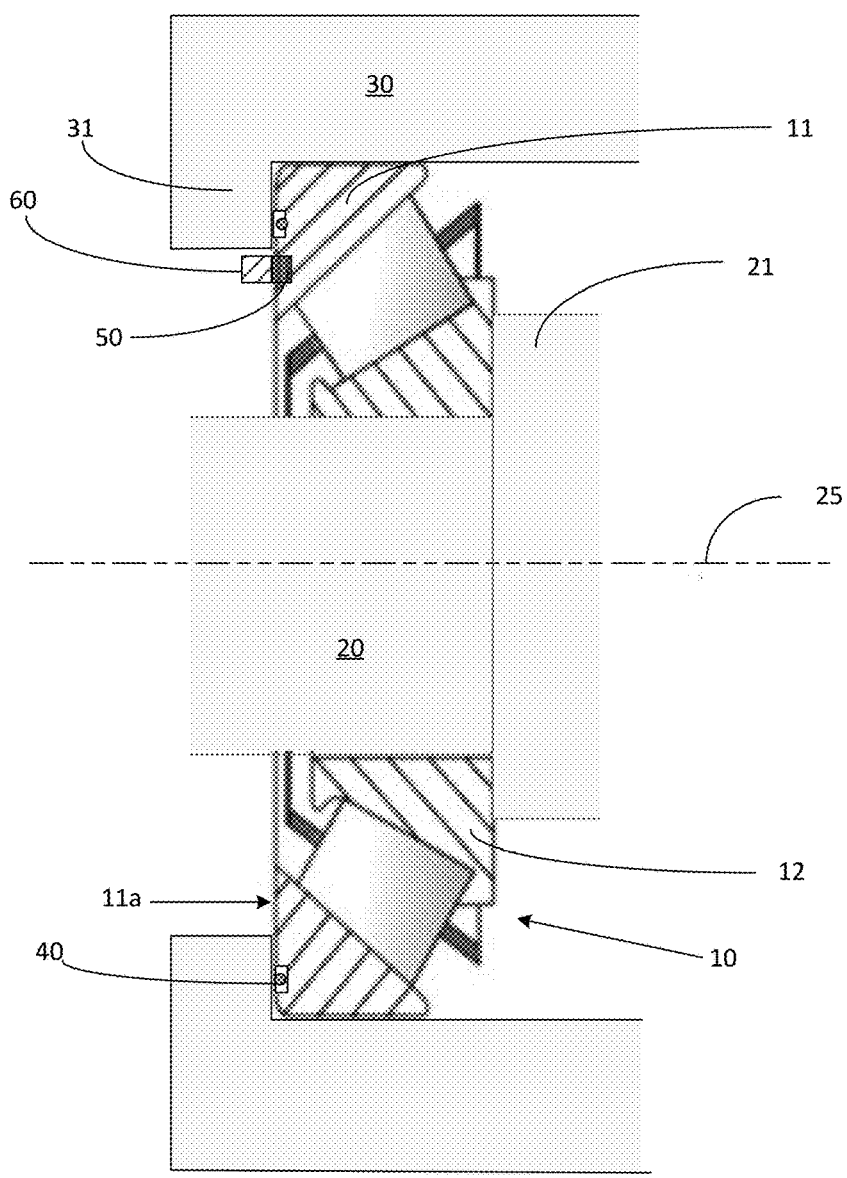
FIG. 1a shows an axial cross-section of a first example of a bearing according to the invention comprising a fiber-optic cable coupled to the bearing via an angled connector.

FIG. 1a illustrates an example of a rolling element bearing according to the invention, mounted in an application. The bearing 10 is a spherical roller thrust bearing, which supports a pump shaft 20 relative to a pump housing 30. The shaft 20 is rotational about an axis 25. An outer ring 11 of the bearing is mounted to the housing 30 in axial abutment against a flange part 31 of the housing. An inner ring 12 of the bearing is mounted on the shaft, in axial abutment against a shoulder part 21 of the shaft. The bearing is specially adapted for transferring axial loads on the shaft 20 to the housing 30.

In order to monitor the load, for the purpose of, for example, estimating bearing life and predicting when the bearing will require replacement, the bearing is equipped with an optical strain gauge, typically a Bragg grated optical sensing fiber 40 that is provided in a circumferential groove in a side face 11a of the bearing outer ring. An optical signal for the sensing fiber 40 is provided and analyzed by an optical interrogator, which is arranged outside the pump housing 30. The sensing fiber 40 is connected to the interrogator via a fiber-optic cable.

To enable the bearing 10 to be mounted in the housing 30, without the cable being attached to the bearing, a fiber-optic socket 50 is integrated in the bearing outer ring 11. The socket 50 is integrated in a recess that is provided in the side face 11a of the outer ring, whereby the sensing fiber 40 is optically coupled to the socket 50. Preferably, the socket is completely integrated within the recess, such that no part thereof protrudes from the outer ring side face 11a. This makes the bearing easier to handle and mount and optimally protects the socket from damage. However, in applications where it is not possible to drill a recess of sufficient depth in the bearing ring, it is possible for the socket to be only partly integrated within the bearing ring.

Figure 1B:
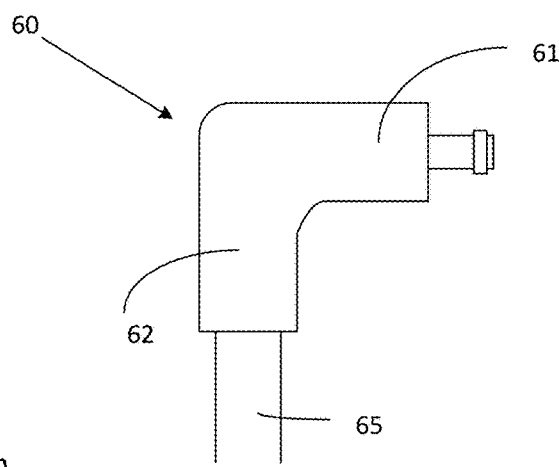

The socket 50 is adapted to receive a cable connector 60, which is shown in side view in FIG. 1b. The connector is an angled connector having a straight body section 61 that fits into the socket 50 and an angled body section 62 that extends from the straight section 61 at an angle of approximately 90° in this example. Due to the angle of the angled body section 61, relative to a longitudinal axis of the recess and socket, the fiber-optic cable 65 can be guided in a circumferential direction of the bearing. Within the bearing arrangement, rotation of the shaft 20 causes a flow of lubricant. The cable 65 is exposed to the lubricant flow and to reduce the strain on the cable, it is beneficial if the cable does not cross the flow in lengthwise direction. In the bearing of the invention, the lengthwise direction of the cable 65 is guided in circumferential direction of the bearing, minimizing the strain on the cable.

The angled body section 62 of the connector 60 is arranged such that the circumferential direction in which the cable 65 extends coincides with the rotation direction of the shaft. In a further development, the connector 60 and socket 50 have a circular geometry and are configured such that the connector can swivel through 180°. Thus, if the direction of rotation and lubricant flow reverses, the circumferential direction of the cable is also easily reversible.

Figure 2B:
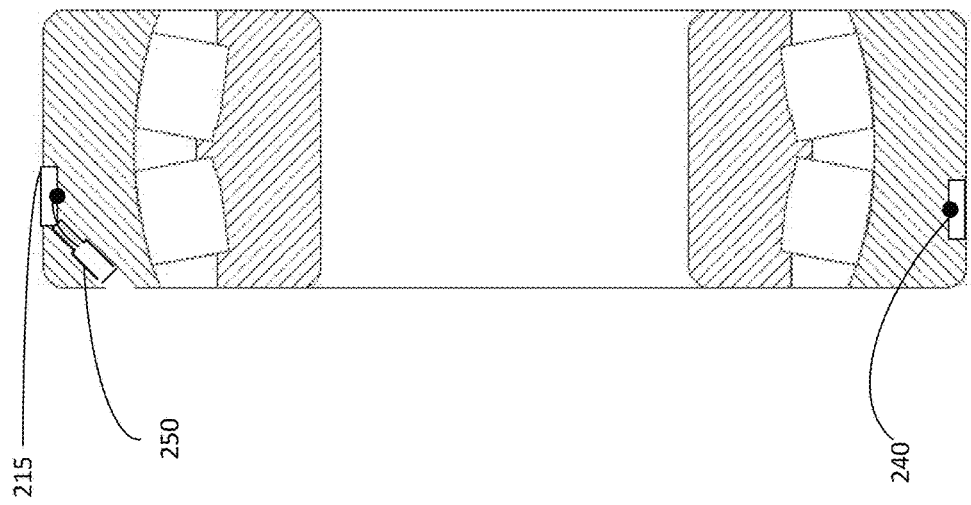
FIGS. 2a-2c show axial cross-sections of a second example of a bearing according to the invention, at different stages during the production and mounting process.
Figure 2A:
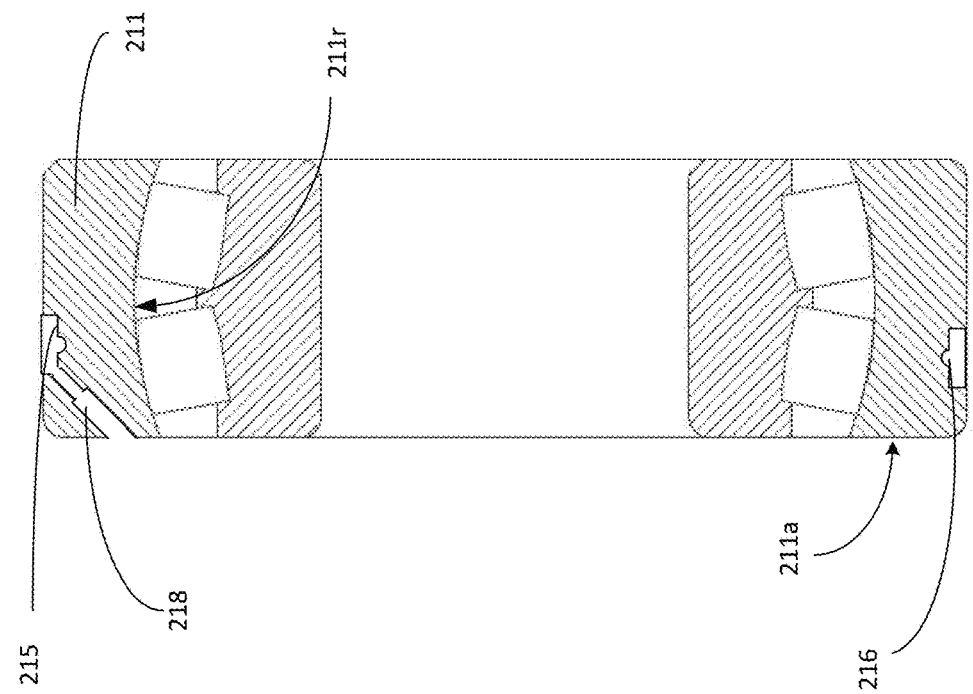
Figure 2C:
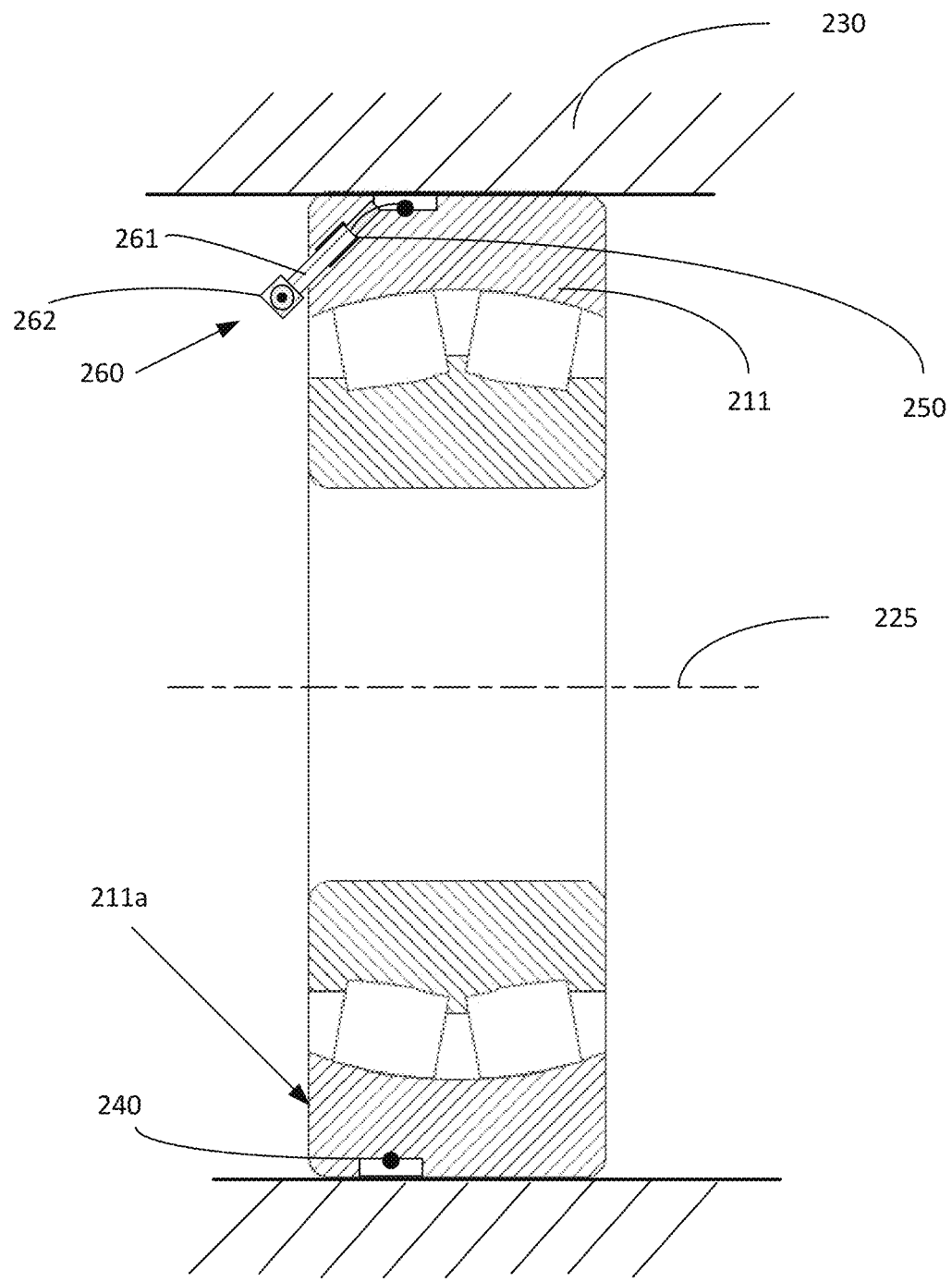

A further example of a bearing according to the invention is shown in different stages of its production and mounting in FIGS. 2a-2c. In the depicted example, the bearing 210 is a spherical roller bearing provided with a sensing fiber 240 on a sensing surface, being an outer cylindrical surface of the outer ring 211. The fiber is a Bragg grated optical sensing fiber for sensing strain and temperature.

As part of the production process, an annular slot 215 is machined into the outer circumference of the bearing outer ring 211 (refer FIG. 2a). The slot 215 enables the bearing to be mounted in a housing without damaging the sensing fiber and has a depth that locates the sensing fiber closer to an outer raceway 211r of the bearing, thereby increasing the sensor's sensitivity to the strains induced by the passage of loaded rollers. In addition, a groove 216 is machined within the slot 215 for accommodating the sensing fiber. This ensures accurate retention of the fiber and also brings it closer to the outer raceway.

In the intended application, it will not be possible for the sensing fiber to emerge from the sensing surface via the outer cylindrical surface. Consequently, a recess 218 is machined into a side face 211a of the outer ring, which extends through to the annular slot 215.

The recess 218 is shaped to receive a socket 250 which, as shown in FIG. 2b, is inserted into the recess. The sensing fiber 240 is attached within the slot groove 216 and is optically coupled to the socket 250. The socket may then be covered by e.g. a cap, for protection during transportation and mounting.

As shown in FIG. 2c, the outer ring 211 of the bearing 210 is mounted in a housing 230. The sensing fiber 240 can easily be coupled to an optical interrogator by means of a cable with a connector 260 that fits into the socket 250. In accordance with the invention, the connector has a straight body section 261 that fits into the socket 250 and has an angled body section 262, which extends at angle of approximately 90° from the straight section, enabling the cable to follow a circumferential direction of the bearing. Suitably, the circumferential direction coincides with the rotation direction of the bearing and thus the flow direction of the lubricant within the bearing arrangement.

In the example depicted in FIGS. 2a-2c, the recess 218 has a longitudinal axis that is angled in the depicted axial cross-section of the bearing, relative to the bearing rotation axis 225. The angle between the straight body section and the angled body section is arranged in a different plane. In a further embodiment of the invention, the angle of the recess and of the angled body section are arranged in the same plane, which has advantages that will be explained with reference to FIGS. 3a and 3b.

FIG. 3a is a side view of a bearing 310 comprising a recess 318 in the side face 312a of the inner ring 312. It is to be understood that the bearing will be equipped with a sensing element on a sensing surface, which is in communication with the recess and that a socket will be integrated in the recess and connected to the sensing element. In the depicted example, the sensing element is an optical sensing fiber arranged in a circumferential groove in the bore of the inner ring.

FIG. 3b shows a cross-sectional view of the bearing inner ring 312, taken through the line X-X in FIG. 3a which intersects the recess. A cable connector 360 that is adapted to be received within the recess is also shown. The connector has a straight body section 361 and an angled body section 362 that extends therefrom with a first angle α. In this example, the first angle α is approximately 120°. Furthermore, the recess 318 has a longitudinal axis 319 which is angled with a second angle β relative to a normal 370 to the surface 312a in which the recess 318 is provided. In the depicted example, the angle β is approximately 30°.

The angle at which the cable 365 and angled body section 361 extend, relative to the surface 312a, therefore depends on both α and β. In the depicted example, the orientation of the angled body section is perpendicular to the surface normal 370, meaning that the cable is directed in circumferential direction. The angled recess 318 enables the angled body section to have a first angle α that is greater than 90° while remaining essentially perpendicular to the surface normal 370 of the surface 312a in which the recess 318 is provided. This means that the cable within the connector 360 follows a larger bend radius, compared with a right-angled connector.

While maximum protection for the cable is achieved when the angled body section extends perpendicular to the surface normal as described above, a beneficial effect can also be achieved at angles of between 70 and 120°.

The invention is thus not restricted to the above-described embodiments, but may be varied within the scope of the following claims.

What is claimed is:

1. A rolling element bearing comprising,
a first bearing ring,
a second bearing ring,
at least one row of rolling elements disposed between raceway surfaces of the bearing rings,
a sensing element provided on a sensing surface of the first bearing ring, and a signal cable connected to the sensing element, wherein
the signal cable includes a cable connector that fits into a socket, and wherein the socket is at least partly integrated in a recess provided in an external surface of the first bearing ring, wherein
the recess is in communication with the sensing surface, and wherein
a signal coupling is arranged between the sensing element and the socket; and
one of the cable connector and the socket has an angled body section that is angled with a first angle α relative to a longitudinal axis of the recess, such that the cable is guided out of the recess at an angle to a normal of the external surface in a substantially circumferential direction of the bearing.

2. The rolling element bearing of claim 1, wherein the cable extends from the angled body section at an angle to the normal of the external surface of between and 70 and 120°.

3. The rolling element bearing of claim 1, wherein the cable connector comprises the angled body section and further has a straight body section that fits into the socket.

4. The rolling element bearing of claim 3, wherein the socket and the straight body section of the cable connector have a circular geometry and are configured such that the cable connector can be swiveled within the socket.

5. The rolling element bearing of claim 1, wherein the socket comprises the angled body section, which protrudes from a straight body section that is integrated in the recess.

6. The rolling element bearing of claim 1, wherein the longitudinal axis of the recess is substantially parallel to the normal of the external surface in which the recess is provided.

7. The rolling element bearing of claim 1, wherein the longitudinal axis of the recess is angled with a second angle β relative to the normal of the external surface in which the recess is provided.

8. The rolling element bearing of claim 7, wherein the first angle α of the angled body section is greater than 90° and wherein an angle of the cable relative to the surface normal is approximately 90°.

9. The rolling element bearing of claim 1, wherein the cable is a fiber optic cable and the sensing element is a fiber optic sensor.

10. The rolling element bearing of claim 1, wherein the cable is an electrical signal cable.

11. The rolling element bearing of claim 1, wherein the external surface in which the recess is provided is a cylindrical surface or an annular side face of the first bearing ring.

12. The rolling element bearing of claim 1, wherein the sensing element is provided in a groove in a cylindrical surface or in an annular side face of the first bearing ring.

\* \* \* \* \*